United States Patent

[11] 3,623,756

| [72] | Inventor | Artur Fischer<br>Altheimer Str. 219, D-7241 Tumlingen,<br>Germany |
|---|---|---|
| [21] | Appl. No. | 833,943 |
| [22] | Filed | June 17, 1969 |
| [45] | Patented | Nov. 30, 1971 |
| [32] | Priorities | July 6, 1968 |
| [33] | | Germany |
| [31] | | P 17 84 104.2;<br>July 17, 1968, Germany, No. P 17 75 221.5 |

[54] ASSEMBLY KIT WITH SOCKET MEMBER
7 Claims, 2 Drawing Figs.

[52] U.S. Cl............................................. 287/92,
287/54, 46/26
[51] Int. Cl...................................................... F16c 11/00
[50] Field of Search............................................ 46/26, 29,
23, 16, 17; 52/645, 655; 287/92, 54 C, 14; 64/17

[56] References Cited
UNITED STATES PATENTS

| 2,027,499 | 11/1936 | Tully............................ | 287/92 X |
| 2,225,612 | 12/1940 | Allen............................ | 46/26 X |
| 2,982,379 | 5/1961 | Fisher........................... | 52/645 |
| 3,181,542 | 5/1965 | Bareis........................... | 287/99 X |
| 3,486,268 | 12/1969 | Fischer.......................... | 46/16 |
| 84,161 | 11/1868 | Bigelow......................... | 64/17 |
| 3,396,553 | 8/1968 | Potter........................... | 64/17 X |

*Primary Examiner*—Andrew V. Kundrat
*Attorney*—Michael S. Striker

ABSTRACT: A plurality of bar-shaped structural elements are provided in an assembly kit. A socket member serves for connecting at least two of these structural elements to one another and comprises first and second connecting means each of which is operative for releasably engaging an end portion of one of the structural elements and connecting the same to the socket member. At least one of the connecting means enables movement of the associated structural element relative to the socket member in a predetermined direction and plane.

3,623,756

ASSEMBLY KIT WITH SOCKET MEMBER

BACKGROUND OF THE INVENTION

The present invention relates generally to assembly kits, and more particularly to assembly kits comprising a plurality of structural components or elements.

Assembly kits are known which utilize, inter alia, a plurality of bar- or rod-shaped structural elements from which grid-shaped structures can be assembled. In order to connect such bar-shaped elements to one another it is known to provide a connector element by means of which the bar-shaped elements can be secured to one another, that is via the intermediary of the connector element, so as to assume predetermined positions relative to one another. In this manner it is possible to construct bridges, towers, and the like.

Basically, these connector elements fulfill their primary function well, namely to connect the various bar-shaped elements rigidly with one another. This is accomplished by providing the connector element with apertures into which end portions of the bar-shaped elements are inserted so that, upon such insertion, the bar-shaped elements are rigidly connected with the connector element in predetermined position, and therefore also rigidly connected with one another in predetermined position. However, this of course is not the manner in which bar-shaped elements are actually connected with one another in such constructions as bridges, tunnels or the like. This is to say that a child utilizing assembly kits of the aforementioned type cannot experience—and therefore will learn nothing about—the actual interrelationship which the bar-shaped elements must have with one another in order to establish a rigid structure where the use of connector elements of the type employed in these prior art assembly kits is not possible, that is in the erection of actual bridges or towers or the like. For instance, there is no need to provide diagonal stiffening members in such a structure erected with an assembly kit of the aforementioned type, because they cannot contribute anything to the rigidity of the structure; absent any teaching in this direction, the assembly kit can impart such knowledge to the playing child and will not fulfill the teaching function which is now universally recognized as one of the major desirable purposes of such assembly kits.

A further problem encountered with assembly kits of the aforementioned type is that the bar-shaped elements can be connected with the connector element—and therefore located relative to one another—only in specific predetermined relationships; this makes it impossible to vary these relationships and accordingly it is not feasible to vary the dimensions of a structure which can be erected.

SUMMARY OF THE INVENTION

It is, accordingly, an object of the present invention to overcome the aforementioned drawbacks.

More particularly it is an object of the present invention to provide an assembly kit utilizing bar-shaped structural elements in conjunction with a connecting element or socket member, and which is not possessed of these disadvantages.

A further object of the invention is to provide such an assembly kit wherein the rigidity of the structure erected with the assembly kit depends upon the relationship of the individual bar-shaped elements relative to one another, thus simulating real-life conditions, and wherein the dimensions of the structure which can be erected may be varied within a wide range of possibilities.

In pursuance of the above objects, and others which will become apparent hereafter, one feature of my invention resides in the provision of an assembly kit which comprises a plurality of bar-shaped structural elements, and a socket member for connecting at least two of these structural elements to one another. According to my invention the socket member comprises first and second connecting means each of which is operative for releasably engaging an end portion of one of the structural elements and for connecting the same to the socket member. Further, at least one of the connecting means enables movement of the associated element relative to the socket member in a predetermined direction and plane.

With such a construction it is possible to vary the angular position of two or more of the bar-shaped structural elements relative to one another. Thus, the dimensions of a structure which is erected or erectable with the kit can be varied within a wide range of possibilities. Furthermore, because one or more of the structural elements are movable in accordance with the present invention, a child playing with a kit according to this invention will instinctively develop an understanding of the necessity for rigidifying the structure by the manner in which the structural elements are arranged with reference to one another, and connected to one another, rather than by the specific type of connecting means used for connecting them.

It will be appreciated that the connection between the connecting means and the bar-shaped elements may be effected in various different ways, for instance it may be a snap-action type of connection. It will also be appreciated, as has already been briefly suggested above, that two or more of the aforementioned connecting means may be so constructed as to enable movement of the associated bar-shaped structural element relative to the socket member, always in a predetermined direction and plane.

If, as is very advantageous, the present invention is utilized in an assembly kit of the type which comprises coupling means consisting of undercut coupling projections and coupling grooves on additional building blocks constituting a part of the kit, then it is advantageous that complementary coupling means—that is either male or female or both types of connecting means—be provided on the socket member so as to enable coupling of the same to the other structural blocks or elements of the kits. This greatly enhances the versatility of such assembly kits.

At least one of the connecting means may, in accordance with a further feature of my invention, be composed of at least two sections which may be pivotably connected with one another, with one of the sections being arranged to engage an end portion of one of the bar-shaped structural elements. Advantageously, the pivoting axis for the two sections will extend transversely of—and preferably normal to—the direction of movement afforded by the one connecting means. Such a construction makes it possible to provide greater flexibility of angular displacement of the structural elements than would be the case if for instance a ball-and-socket joint were provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
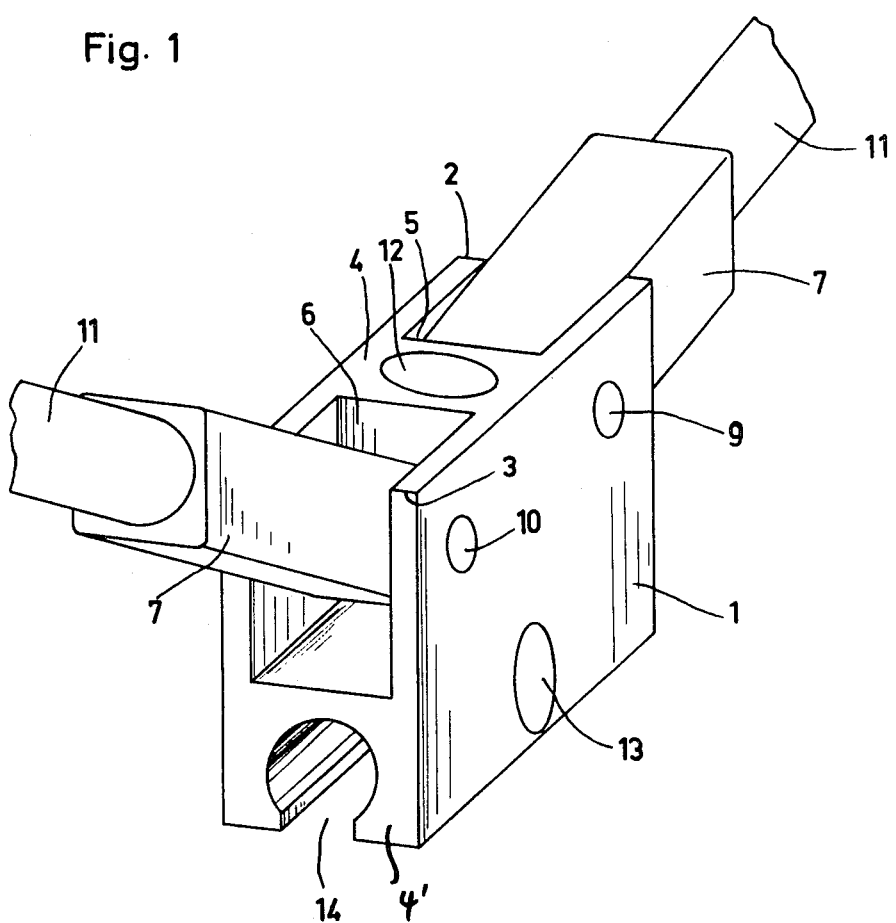
FIG. 1 is a perspective somewhat-diagrammatic view illustrating an embodiment of the invention in fragmentary form.

As shown in FIG. 1, the socket element according to the invention is identified with reference numeral 1 and is of substantially block-shaped configuration. It is bounded in the illustrated embodiment by two pairs of mutually opposite edge faces, one of which is identified with reference numeral 4 and the other one of which, extending at a right angle thereto, is identified with reference numeral 4'. The second edge face opposite the one identified with reference numeral 4, and the second edge face opposite the one identified with reference numeral 4', are not shown but it will be understood that they are coextensive with their respectively associated edge faces.

In the illustrated embodiment the corners 2 and 3 of the socket member 1 are provided with cutouts 5 and 6 of the illustrated configuration. Connecting means are arranged in these cutouts, and are generally identified with reference numeral 7. In the illustrated embodiment these connecting means are simply members of the illustrated configuration, or of an analogous configuration, having a bore or an opening in which an end portion of one of the bar-shaped or rod-shaped structural elements 11—shown in fragmentary illustration— can be frictionally retained. However, snap-action coupling and the like is also possible between the elements 11 and the members 7.

According to the present invention at least one—and in the illustrated embodiment both—of the members 7 are connected with the socket member 1 for pivoting movement, via the axes 9 and 10. This means that each of the members 7 can pivot about its associated axis 9 or 10, respectively, in one direction or in one plane, that is in a plane normal to the respective pivot axes.

According to the present invention a further opening 12 is provided in the one surface 4 intermediate the cutouts 5 and 6, and this is so dimensioned as to receive an end portion of an additional nonillustrated structural element 11. An analogous opening 13 is provided in one of the side faces of the socket 1, as illustrated, for the same purpose as the opening 12.

The surface or edge face which is located opposite the one identified with reference numeral 4 is provided, in the illustrated embodiment, with an undercut female coupling portion 14 in form of a coupling groove having the cross-sectional configuration which is evident from FIG. 1 and in which a complementarily configured undercut coupling head of another structural element of the type known from the art, and therefore not illustrated in the drawing, can be received whereby the socket 1 can be connected to such structural element or elements. Preferably, and as illustrated, the elongation of the groove 14 is coincident with the plane in which the members 7 are turnable about their respective axes 9 and 10. In place of the opening 13 there may be provided another groove corresponding to the groove 14, but crossing the same, that is extending from the visible side face in FIG. 1 to the other opposite side face which is not visible.

Figure 2:
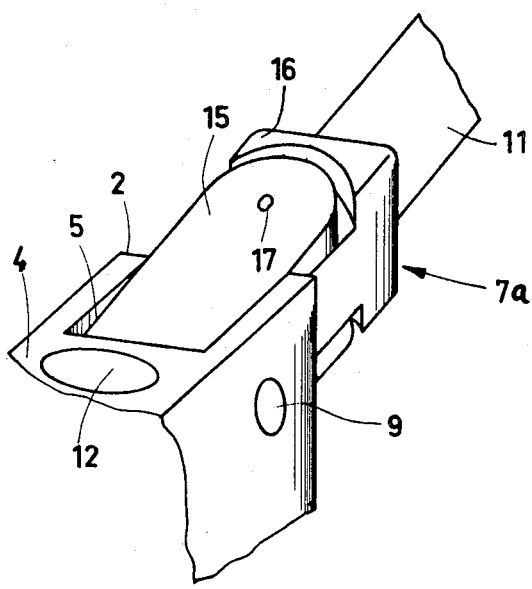
FIG. 2 is a fragmentary detail view, on an enlarged scale, of a further embodiment of the invention.

The embodiment in FIG. 2 is to be understood as being substantially the same as that in FIG. 1. The difference is that the member 7a here consists of at least two sections, identified with reference numeral 15 and 16. Of these, the section 16 is provided with a bore or the like in which an end portion of the structural element is receivable, by friction or in other suitable manner. The section 16 in turn is connected with the section 15 via a pin or the like identified with reference numeral 17 and defining a pivot axis about which the section 16 can pivot with respect to the section 15. In the preferred illustrated embodiment of FIG. 2 the pivot axis defined by the pin 17 extends normal to the pivot axes defined by the shafts or pins 9 and 10, respectively.

It will be appreciated, of course, that it is possible to provide only a single one of the elements 7, whether they be of the type shown in FIG. 1 or that shown in FIG. 2, and that more than two may also be provided. Of course, they may also be located in different relationship with reference to one another than what has been shown.

It will be understood that each of the elements described above, or two or more together, may also find a useful application in other types of constructions differing from the types described above.

While the invention has been illustrated and described as embodied in an assembly kit, it is not intended to be limited to the details shown, since various modifications and structural changes may be made without departing in any way from the spirit of the present invention.

I claim:

1. In an assembly kit, in combination, a plurality of bar-shaped structural elements; socket means, including first and second connecting means operative for releasably engaging respective end portions of at least two of said elements, at least one of said connecting means being a connecting element mounted for pivoting movement about a predetermined axis and being composed of at least two portions secured to one another with freedom of tilting movement about a given axis; building blocks provided with undercut coupling portions; and at least one complementary undercut coupling portion on said socket means for enabling releasable coupling of the latter to respective building blocks.

2. In an assembly kit as defined in claim 1, wherein said given axis and said predetermined axis cross one another in space.

3. In an assembly kit, in combination, a plurality of bar-shaped structural elements; socket means, including first and second connecting means operative for releasably engaging respective end portions of at least two of said elements, at least one of said connecting means enabling pivotal movement of the associated one of said elements with reference to said socket means in at least one predetermined plane; building blocks provided with undercut coupling portions; and at least one complementary undercut coupling portion on said socket means for enabling releasable coupling of the latter to respective building blocks.

4. In an assembly kit as defined in claim 3, the other of said connecting means also enabling movement of the associated element relative to said socket means in a predetermined direction and plane.

5. In an assembly kit as defined in claim 4, said socket means having an exposed surface provided with two spaced-apart marginal portions, and each of said connecting means being provided on said socket means in the region of one of said marginal portions.

6. In an assembly kit as defined in claim 3; and further comprising at least one additional complementary undercut coupling portion provided on said socket means.

7. In an assembly kit as defined in claim 6, at least one of said undercut complementary coupling portions being elongated in said predetermined plane.

* * * * *